United States Patent [19]
Johnson

[11] 3,731,369
[45] May 8, 1973

[54] METHOD AND APPARATUS FOR FORMING AND SETTING RIVETS INTEGRAL WITH A LAYER

[75] Inventor: Verner A. Johnson, Livonia, Mich.

[73] Assignee: Johnson Die & Engineering Co., Detroit, Mich.

[22] Filed: Oct. 27, 1971

[21] Appl. No.: 193,076

[52] U.S. Cl. ............... 29/509, 29/33 K, 29/200 B, 29/243.53, 29/522, 113/1 N, 113/116 FF, 220/54, 287/189.36 D
[51] Int. Cl. ............... B21d 39/00, B23p 11/00
[58] Field of Search ............... 29/509, 509 R, 522, 29/33.2 X, 200 B, 243, 53; 113/121 C, 116 FF; 287/189.36 D; 220/54

[56] References Cited

UNITED STATES PATENTS

| | | |
|---|---|---|
| 1,252,289 | 1/1918 | Murray ............... 113/116 FF UX |
| 2,398,532 | 4/1946 | Keehn ............... 29/509 UX |
| 3,176,872 | 4/1965 | Zundel ............... 29/509 R UX |
| 3,276,112 | 10/1966 | Tantlinger et al. ............... 29/509 X |
| 3,301,433 | 1/1967 | Wade ............... 220/54 |
| 3,479,979 | 11/1969 | Dunn ............... 29/509 X |
| 3,557,425 | 1/1971 | Scharf ............... 113/116 FF X |

*Primary Examiner*—Charlie T. Moon
*Attorney*—Benjamin W. Colman

[57] ABSTRACT

An assembly of two layers of metallic material conjoined by an extruded elongated rivet formed in and from one layer, and further extruded over and about the perimeter of an opening in the second layer, is disclosed. The second extrusion results in a lateral deformation conditioned by the first extrusion. The extruded elongated rivet form is developed through an extrude punch operation leaving a blind hole cavity in the rivet form with a depression at the base of the cavity and a depression on the exposed outer side of the rivet form, axially aligned and in opposing relationship with the cavity depression. Conjunction is obtained with the second perforated layer when the two layers are conjunctively arranged and the rivet form is further extruded. The inventive tooling and process for forming the extruded rivet form and for conjoining the two layers are also disclosed.

12 Claims, 6 Drawing Figures

PATENTED MAY 8 1973 3,731,369
SHEET 1 OF 2
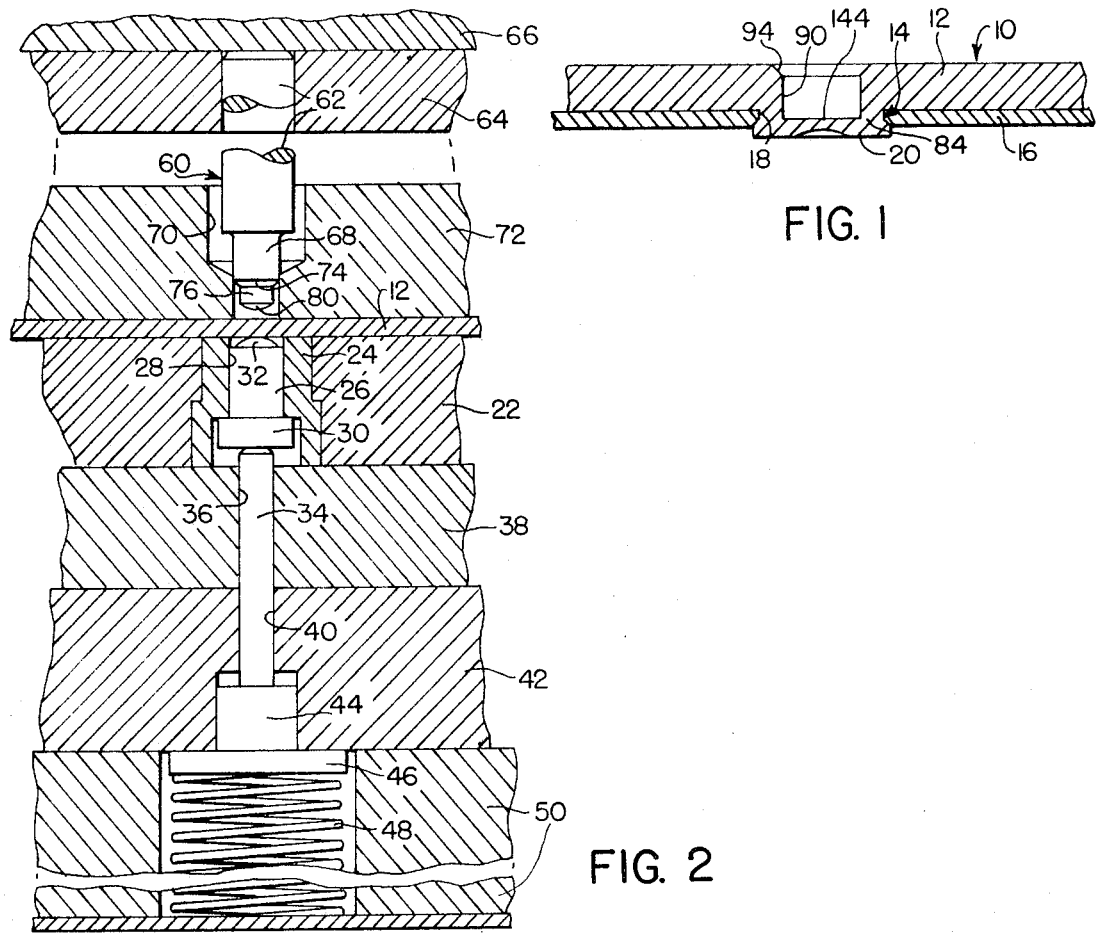
FIG. 1
FIG. 2
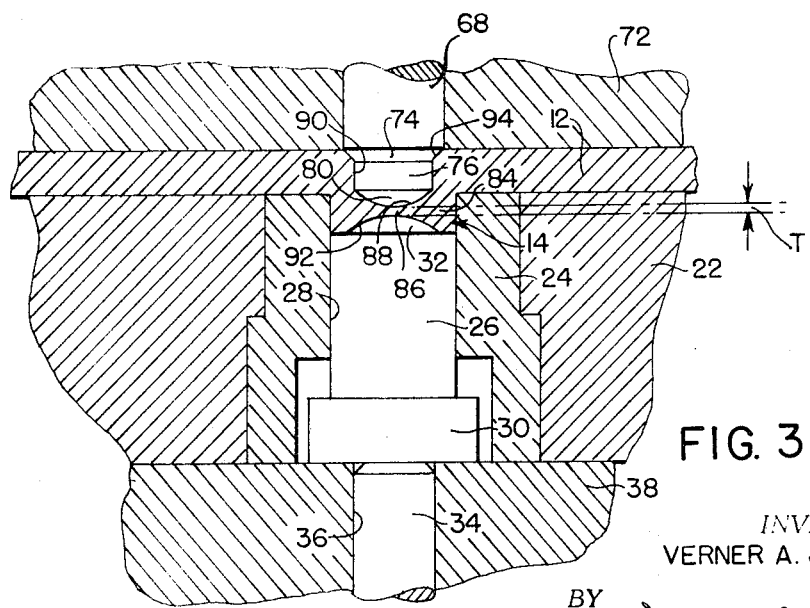
FIG. 3
INVENTOR.
VERNER A. JOHNSON
BY
ATTORNEY

METHOD AND APPARATUS FOR FORMING AND SETTING RIVETS INTEGRAL WITH A LAYER

The invention relates to a system for first extruding an elongated solid rivet form in and from one layer of a metallic material to be conjoined to a second layer of metallic material by the extruded rivet form at an opening in the second layer. An essential requirement is to extrude the rivet form to a length such that it extends substantially beyond the thickness of the metal layer to be conjoined thereby. A second essential requirement is that the rivet form be extruded with a depression in the outer surface of its base, so that when the second extrusion operation is performed, the base metal will flow axially and laterally in the tooling to flange over and secure the second layer at the perimeter of the pierced opening therein.

The metallic materials to which the invention can be applied include hot and cold rolled steels of relatively low carbon content, as for example grades 1009, 1010 and 1020 with any finish, stainless steel grades which have been spherodized annealled, most grades of brass, copper, aluminum of extrusion quality, and other metals in alloy or composition grades which qualify for cold formed extrusions.

At the present time, the economics of metal processing and assembly are such that reduction in cost is a prime necessity, demanding special and inventive working of the metals. The elimination of the more expensive individual rivets, requiring that they be separately applied and located one by one in the layers of metal to be conjoined before peening or staking, is a most desirable and necessary goal. The invention hereindisclosed meets that goal.

The tooling and process for extruding the closed end rivet form are parts of the invention disclosed herein. The process includes deforming by extrusion the first metal layer to form the rivet body in a single operation, so that metal in the central axial zone of the rivet form is caused to flow axially and laterally of the extrude punch between the driving highly polished crowned end surface of the punch and the highly polished crowned end of an axially aligned extrude anvil yieldingly resistant therebelow. The metal extruded into the die cavity is driven and flows over the crowned face toward the peripheral edges of the yieldingly resistant extrude anvil to produce the elongated rivet form. A substantial quantum of metal is thus transferred forwardly of the punch end to elongate the rivet form beyond the thickness of the metal layer from which the rivet form is produced. A second layer of metal is pierced to provide an opening for and to receive the rivet body, the edge of the opening being either square with the metal layer or chamfered on the side at which conjunction, by a second extrusion operation, is effected. The rivet end and base are deformed axially and laterally upon the second sheet in the area about the opening, securing the two layers of metal firmly together.

It is an object of the invention to produce a rivet form by extrusion directly from a sheet or layer of metal to be conjoined to another similar layer, the rivet form having a body length beyond the plane of the sheet substantially greater, or at least no less, than the thickness of the metal sheet from which it is formed. Another object is to provide tooling and process for extruding such rivet form having a laterally deformable base. A further object is to extrude the rivet body from a metal layer by squeezing the metal forwardly of the extrude punch into a die cavity against a yieldingly resistant extrude anvil, toward each side of the die cavity and over and about the crown end of the anvil. Still another object is to provide process and tooling means for further extruding the rivet form when assembling the first layer with the second layer of material, whereby a conjunction of metal, or metallic and non-metallic, sheets can be more economically effected.

Various further and more specific objects, features and advantages of the invention will appear from the description given below, taken in connection with the accompanying drawings, illustrating by way of example preferred forms of the invention.

Reference is here made to the drawings annexed hereto and forming an integral part of this specification, in which FIG. 1 is a vertical sectional view of metallic first and second layers assembled and conjoined in accordance with the invention.

FIG. 2 is a vertical sectional view of tooling for extruding the solid rivet form from the first or base layer.

FIG. 3 is a vertical sectional view, on a somewhat enlarged scale, of the extrusion operation of the rivet form, by a portion of the tooling illustrated in FIG. 2.

Figure 4:
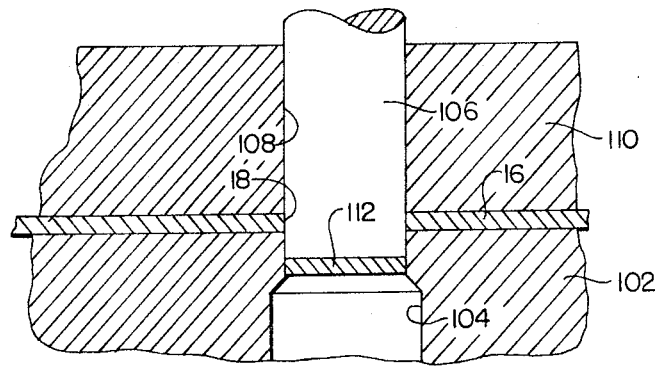
FIG. 4 is a vertical sectional view of tooling piercing the rivet body receiving hole in the second layer.

As illustrated particularly in FIG. 1, the metallic layer assembly 10 comprises the first or base layer 12 from which the rivet form 14 is extruded, the conjoined second layer 16 having the pierced opening 18 through which the rivet form 14 is passed and about which the rivet end 20 is extruded to secure the two layers 12 and 16 closely together in conjunctive relationship.

It will be understood that the relative thickness of the metal layers 12 and 16 cannot be illustrated with any precision in the drawings. Nor do these illustrations indicate or limit their relative thicknesses in the light of the disclosure of the invention. It will be further understood by persons skilled in the art to which the invention pertains that the relative thicknesses of the two layers may vary according to the requirements of particular applications to which the invention is directed. In some instances, the thickness of the second layer is greater than that of the base layer, or as shown, the second layer thickness is less than that of the base layer.

To produce the extruded rivet form 14 of this invention, reference is made to FIGS. 2 and 3 of the drawings. The base sheet 12 is placed upon the button retainer 22 and the extrude button 24 over the extrude anvil 26 disposed in the die cavity 28 of the extrude button. The extrude anvil 26 is provided with a base 30 at one end and a forwardly projecting convexity 32 at its distal end. A pressure pin 34 is axially movably disposed in the bore 36 of the backing plate 38 and the bore 40 of the die block 42. According to conventional practice, the pin base 44 is seated upon the spacer disc 46 and biased upwardly by the spring 48 in the lower die shoe 50. The extrude anvil highly polished distal crown end 32, in its initial position, is biased upwardly against the underside of the first layer 12 by the spring 48.

The extrude and chamfer punch 60 has its shank 62 secured in the punch retainer 64 under the backing plate 66 and the upper die shoe (not shown). The extrude punch portion 68 is disposed in the counterbored and countersunk opening 70 of the stripper 72 that bears upon the upper face or side of the first metal layer 12 during the rivet form extrusion operation. The extrude punch portion 68 terminates at its distal end in a tapered chamfer punch section 74, and the pin portion 76 having the distal highly polished crown end 80. The chamfer punch section 74 has its frusto-conical surface at an angle of substantially 45° to a horizontal plane normal to the axis of the tool.

Before the extrude punch tip end 80 and the portion 76 strike and enter the first layer 12, the crown end 32 of the extrude anvil 26 bears against the underside of the sheet 12, being biased thereagainst by the pressure spring 48. When the extrude punch 60 enters the layer 12, the rivet body 84 is formed in the die cavity 28 of the extrude button 24 with a solid base 86 having a depression 88 at the bottom of the extrude punch cavity 90 and a depression 92 on the outer surface of the base 86. The depressions 88 and 92 are disposed in opposing relationship. A chamfer 94 is formed at the top of the punch cavity 90 by the extrude punch chamfer section 74. By virtue of the spring 48, the extrude anvil 26 yieldingly resists the extrusion by the extrude punch 60 until the extrude anvil base 30 seats upon the backing plate 38, limiting the extruded length of the rivet form body 84. When the extrude punch 60 and stripper 72 are raised, the pressure pin 34 under the biasing force of the spring 48 pushes the extrude anvil 26 upwardly to discharge the rivet form 14 from the die cavity 28 for removal of the first or base layer 12 from the tooling.

In this extrusion operation forming the rivet form 14, a critical dimension is the distance between the peak of the extrude punch crown end 80 and the peak of the extrude anvil crown end 32. This dimension T is directly related to the amount of metal which is squeezed into the die cavity 28 between these ends. The smaller this dimension T becomes, the more metal is forced into the cavity 28 toward and upon the extrude anvil end, whereby a substantially elongated rivet body 84 is formed. It will be recognized that the highly polished crown ends of the extrude punch and the extrude anvil, which may be convexly curved as shown (FIGS. 2 and 3) or conically tapered, determine primarily the directions and extent of flow of the metal base layer 12 into the rivet form 14.

Although the rivet form 14, having the axial counterbored cavity 90 with a countersunk portion 94 at its upper end, and the outer concavity 92 in its solid base 86, is hereindescribed and termed a "solid" rivet form, such terminology is used to distinguish the rivet form from what might be inaccurately described as a "tubular" rivet form in view of the internal cavity formed by the extrude punch. The height and/or thickness of the intermediate base 86 will, of course, vary in dimension, according to the requirements of particular applications for the invention, depending upon the thickness of the base metal layer 12, the presence or absence of the extrude punch chamfer portion 74 (which may be eliminated in some instances), the diameter of the die cavity 28, the diameter and depth of penetration of the extrude punch pin portion 76, as well as the physical properties of the base metal layer 12 and its extrusion characteristics.

The second sheet 16 is prepared to receive the body 84 of the rivet form 14 by a piercing operation (FIG. 4), with or without a secondary chamfering operation (not shown). The second sheet 16 is placed upon a pierce inset 102 having a punch-out or slug drop-out bore 104 axially aligned with the pierce punch 106 which is slidingly movable in the bore 108 of the stripper 110 adapted to bear upon the second sheet 16. The pierce punch 106 is mounted in a punch retainer under a backing plate and the upper die shoe, according to currently conventional practice. The pierce punch 106 is passed through the second layer 16 to pierce the slug 112 therefrom and discharge it through the discharge bore 104 of the pierce insert. The opening 18 formed in the second layer 16 by this piercing operation normally leaves a slight burr or ragged edge of greater or lesser measure at the downstream edge of the opening. If the burr is considered excessive and must be removed, a secondary deburring or chamfering operation is performed, either by use of a conventional deburring or chamfering tool, or by a chamfering punch, according to currently conventional practice.

Figure 5:
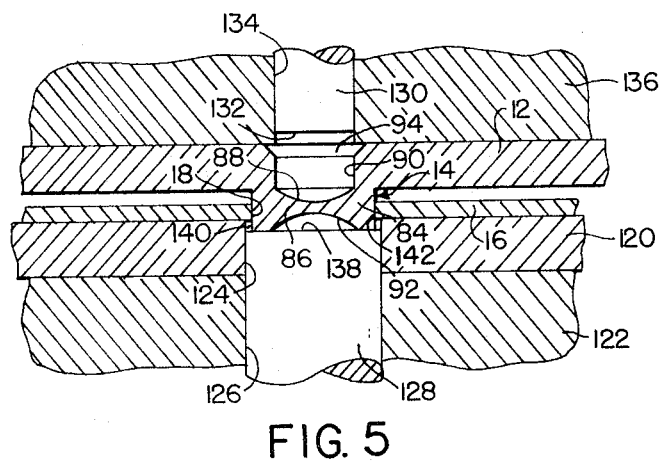
FIG. 5 is a vertical sectional view of the tooling and the two metallic layers arranged for the second extrusion operation, wherein these layers are conjoined into the conjunctive assembly illustrated in FIG. 1.
Figure 6:
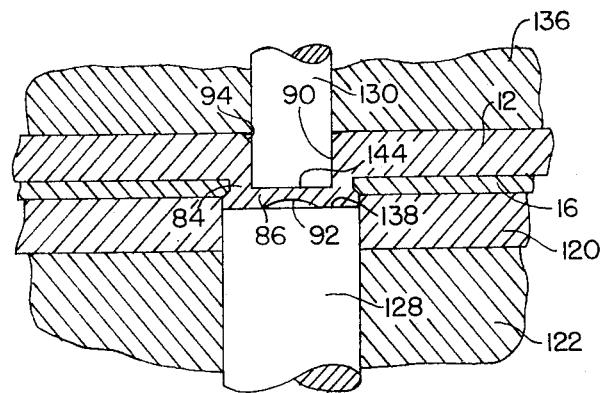
FIG. 6 is a vertical sectional view of the tooling performing the second extrusion operation.

Assembly of the base layer 12 and the pierced second layer 16 is illustrated in FIGS. 5 and 6. As there shown, the first layer 12 with the extruded rivet form 14 is disposed upon the second layer 16 with the body 84 of the rivet form passed through the opening 18 of the second layer. The two layers 12 and 16, thus arranged, are placed upon the support plate 120 secured to the support block 122 thereunder, the support plate and block having bores 124 and 126 respectively in which the staking anvil 128 is positioned. The second extrusion or staking punch 130, having a substantially flat end face 132 normal to its axis, is slidingly disposed in the bore 134 of the retainer block 136. The staking anvil 128 is also provided with a correspondingly substantially flat end face 138.

It will be observed that the rivet body 84 does not fill the entire area of the die cavity over the flat planar top face 138 of the staking anvil 128, this space 140 being annular about the rivet body 84 within the bore 124 of the support plate 120. The interior base depression 88 in the extrude punch cavity 90 is generally concavely formed, as is the exterior base depression 92. When the flat ended staking punch 130 bears upon the base 86 at the depression 88, it will flatten the base 86 in punch cavity 90 into the planar bottom 144 and force the outer lateral distal end metal of the base into the annular open space or area 140 and against the corner 142 at the edge of the second layer pierced opening 18, generally as illustrated in FIG. 6. The rivet body metal is squeezed laterally outwardly over and upon the edge 142 of the pierced opening 18 in the second layer 16, securing the two layers 12 and 16 into conjunctive assembly and relationship.

This operation, which may generally be termed a "staking" operation, is more accurately an extrusion operation, in that the rivet body metal is squeezed into the open space 140 of the die cavity upon the corner edge 142 of the pierced opening 18. It will also be noted in FIG. 6 that the outer concave depression 92 in the rivet form base 86 is now substantially reduced due to the displacement and flow of base metal laterally upon the second layer edge and into the die cavity area 140.

The rivet form extrude operation, involving the conjunctive functions of the extrude and chamfer punch 60 and the extrude anvil 26 yieldingly resistant to the thrust of the extrude punch pin portion 76 and its distal end tip 80 into the first layer 12, to form the solid rivet form 14, utilizes a primary concept of the invention. The resultant extruded solid or closed end rivet form provides the means for conjunction of the first layer with the pierced second layer through the assembly operation described above and illustrated in FIGS. 5 and 6.

The crown end face 80 of the extrude punch 60 and the crown end face 32 of the extrude anvil 26 have been illustrated as being convexly curved and described above as being alternatively conical in configuration. These surfaces must be highly polished and smooth in order to obtain the flow of metal that produces the elongated closed end rivet form 14. Further, the crown configuration of the polished extrude punch and anvil faces is related to the hardness of the sheet metal being deformed. The harder the sheet metal, the more crown is required in order to effect improved flow of metal across the faces of the extrude punch and anvil.

The upward pressure of the spring 48 is directly related to the spread and flow of metal between the extrude punch and anvil as these tools are moving downwardly and before the base flange 30 of the extrude anvil bottoms upon the backing plate 38. The value of the spring pressure is also related to the hardness of the metal being deformed. Persons skilled in the art of die and tool fabrication and their usage will be able to determine these values with relative ease and little experimentation.

Although the second layer or sheet 16 has been described herein as comprising a layer of metallic sheet material, it is to be understood that such second layer, or portion thereof, can take the form of a molded, extruded, or rolled portion of a plastic or composition material provided with the opening 18 adapted to receive the closed end rivet body 84.

It has been established that the economics of the inventive method and construction hereindisclosed result in a very substantial saving over the conventional riveting assembly process heretofore and currently in use. This economic advantage is supplemented by a very positive assembly and conjunction of the two sheets of material, equal or superior to the assembly values of conventional practice.

In this specification, reference has been made to low carbon "soft" steels, stainless steel, copper, aluminum and other metallic materials having extrusion elongation factors or characterisics permitting formation of the rivet forms and assemblies hereindescribed and illustrated. It will be understood that the metals referred to do not comprise the entire list of metallic materials to which the invention is applicable, and that such list of metals is not to be considered a limitation upon the application or utilization of the invention.

Although certain particular embodiments of the invention are hereindisclosed for purposes of explanation, further modifications thereof, after study of this specification, will become apparent to those skilled in the art to which the invention pertains. Reference should be had to the appended claims in determining the scope of the invention.

We claim:

1. Tooling to cold extrude an elongated rivet form in and from a first layer of metallic material as a part thereof, and to further extrude said rivet form in an assembly of said first layer with a pierced second layer, comprising an extrude punch having a highly polished crowned distal end face, punch support means adapted to impel said punch end face into a portion of said first metallic layer, a die adapted to receive said layer portion extruded thereinto by said extrude punch, an extrude anvil slidingly movable in said die and having a highly polished crowned distal end face adapted to yieldingly resist movement of said extruded layer portion in said die, means supporting said anvil for sliding movement in said die and for yieldingly resistant contact with said extruded layer portion, said punch adapted to force said extruded layer portion into the recesses of said die against and across said crowned distal end face of said yieldingly resistant anvil to produce an elongated closed base end rivet body in and from said first layer, said punch and anvil crowned end faces being axially aligned and in opposing crown relationship, a second extrusion punch and a staking anvil in a staking die, said second extrusion punch adapted to further extrude said rivet form upon said staking anvil in said staking die when said rivet form is coupled with said pierced second layer and to spread the extruded base end of said rivet body over and about the pierced opening in said second layer, whereby to conjoin said layers into an assembly.

2. The tooling defined in claim 1, wherein said extrude punch end face is conical in form.

3. The tooling defined in claim 1, wherein said extrude punch end face is convexly curved in form.

4. The tooling defined in claim 1, wherein said extrude anvil end face is conical in form.

5. The tooling defined in claim 1, wherein said extrude anvil end face is convexly curved in form.

6. The tooling defined in claim 1, wherein said extrude punch is provided with a chamfering portion rearwardly of its end face, to increase the amount of said layer portion forced into said die recesses and against said crowned anvil end face, whereby said rivet body length is further elongated.

7. The tooling defined in claim 1, wherein said second extrude punch and staking anvil have end faces which are substantially flat and normal to the axes thereof.

8. The tooling defined in claim 1, wherein
the thickness of the metal in the rivet form to be produced by and between the conjunctive motions of said extrude punch and extrude anvil is directly related to the amount of metal to be forced into said die cavity over the crowned end face of said extrude anvil.

9. The tooling defined in claim 1, wherein
the thickness of the metal in the rivet form adapted to be produced by and between the conjunctive motions of said extrude punch and extrude anvil is directly related to the amount of metal to be further extruded by and between said second extrusion punch and staking anvil, whereby the extruded end of said rivet form is spread about the pierced opening in said second layer.

10. The process of cold extruding an elongated rivet form in and from a first layer of metallic material as a part thereof and conjoining said first layer to a pierced second layer into an assembly of said layers, comprising the steps of 1. disposing a portion of said first metallic layer over a die cavity between an extrude punch and a yieldingly resistant extrude anvil,
    said extrude punch having a distal projecting highly polished crowned end face disposed adjacent one side of said layer portion and said extrude anvil axially aligned in said die cavity with said extrude punch and having a distal projecting highly polished crowned end face placed adjacent the other side of said layer portion,
    said end faces being aligned and in opposing crowned relationship about said layer portion therebetween,
2. striking and entering said layer portion with the extrusion crowned end of said punch to force said layer portion into said die cavity and upon said extrude anvil crowned end face,
3. forcing said layer portion in said die cavity to the inner recesses thereof against the yielding resistance of said extrude anvil and elongating said rivet form body in said die cavity over and about the projecting crowned end face of said extrude anvil,
4. producing a relatively solid closed base end rivet body in and from said first layer intermediate said extrude punch end face and said extrude anvil end face at the end of the punch stroke,
5. uniting said first metallic layer with said second layer by inserting said extruded rivet form into and through the pierced opening of said second layer over a staking die,
6. and further extruding said base end of said rivet body by a second extrusion punch upon a staking anvil about said pierced opening in said staking die to spread at least a portion of said base end over and about the edge of said opening and to conjoin said layers into an assembly.

11. The process defined in claim 10, wherein
said rivet body closed base end is provided on its outer axial surface with a substantial depression by said extrude punch and extrude anvil,
and said base end and said depression are substantially reduced by said second extrusion punch upon said staking anvil.

12. The process defined in claim 10, and including the step of
striking and entering said first layer portion with a chamfer zone on said extrude punch rearwardly of said punch crowned end face to force an additional quantum of said layer portion into said die cavity,
whereby to further increase the elongation of said rivet body.

* * * * *